Jan. 19, 1960 R. C. SIMMERMAN ET AL 2,922,141

SWITCHING DEVICES

Filed Jan. 15, 1957 7 Sheets-Sheet 1

INVENTORS
RICHARD C. SIMMERMAN &
MELVIN T. ROUDEBUSH

BY Louis A Kline
Albert L. Sessler, Jr.

THEIR ATTORNEYS

INVENTORS
RICHARD C. SIMMERMAN &
MELVIN T. ROUDEBUSH
BY
Louis A Kline
Albert L. Sessler, Jr.
THEIR ATTORNEYS Jan. 19, 1960　　R. C. SIMMERMAN ET AL　　2,922,141

SWITCHING DEVICES

Filed Jan. 15, 1957　　7 Sheets-Sheet 3

INVENTORS
RICHARD C. SIMMERMAN &
MELVIN T. ROUDEBUSH

BY Louis A. Kline
Albert L. Sessler, Jr.
THEIR ATTORNEYS

SWITCHING DEVICES

Filed Jan. 15, 1957

INVENTORS
RICHARD C. SIMMERMAN &
MELVIN T. ROUDEBUSH
BY Louis A Kline
Albert L. Sessler, Jr.
THEIR ATTORNEYS INVENTORS
RICHARD C. SIMMERMAN &
MELVIN T. ROUDEBUSH
BY Louis A. Kline
Albert L. Sessler, Jr.
THEIR ATTORNEYS Jan. 19, 1960 R. C. SIMMERMAN ET AL 2,922,141

SWITCHING DEVICES

Filed Jan. 15, 1957 7 Sheets-Sheet 6

INVENTORS
RICHARD C. SIMMERMAN &
MELVIN T. ROUDEBUSH

BY Louis A Kline
Albert L. Sessler, Jr
THEIR ATTORNEYS

Jan. 19, 1960 R. C. SIMMERMAN ET AL 2,922,141

SWITCHING DEVICES

Filed Jan. 15, 1957 7 Sheets-Sheet 7

INVENTORS
RICHARD C. SIMMERMAN &
MELVIN T. ROUDEBUSH

BY Louis A Kline
Albert L. Sessler, Jr.

THEIR ATTORNEYS

United States Patent Office 2,922,141

Patented Jan. 19, 1960

2,922,141

SWITCHING DEVICES

Richard C. Simmerman and Melvin T. Roudebush, Dayton, Ohio, assignors to The National Cash Register Company, Dayton, Ohio, a corporation of Maryland Application January 15, 1957, Serial No. 634,260

20 Claims. (Cl. 340—147)

This invention relates to a switching device and more particularly relates to a sequential switching device for use in apparatus in which it is desired to control a plurality of operations to cause them to take place in a predetermined sequence.

The switching means of the present invention is shown here as applied to a data-recording system for causing fixed and variable data to be recorded in a programmed sequence, which program may be changed to suit the needs of various business systems. However, it is to be understood that the switching means of the present invention is not limited to use with such a data-recording system but may be used wherever it is desired to control any apparatus for sequential operation.

In the novel switching device, an interponent is advanced from a starting position in a linear switch-actuating path past a series of switch actuators to cause their corresponding contacts to be operated in succession. The interponent may be caused to be shifted out of said path at any time to interrupt the switching action at any desired point, and another interponent may then immediately be started along said path from the starting position to commence another successive switching operation. Means are provided to return all interponents which have been shifted out of the switch-actuating path back to a position in which they will be ready for re-use when desired, so that an adequate supply of interponents will always be available. The means for advancing the interponents past the switch-actuating means operates constantly, so that no time is lost in a switching cycle in the starting or stopping of this means. Also, since only the shifting of the interponent from said path and no resetting operation of any type is necessary after the completion of a switching cycle before the next cycle can be commenced, a switching operation can be commenced immediately after completion of the preceding operation. For these reasons, the switching device of the instant invention is capable of completing a series of sequential switching operations very rapidly.

It is, therefore, an object of this invention to provide a simple, effective sequential switching means capable of extremely rapid operation.

It is a further object to provide a sequential switching means in which the sequence of switching may be interrupted at any desired point in the sequence and a new sequence started at an initial position without the necessity for a resetting operation.

It is an additional object to provide means to scan a programmed condition directly from a program device, to pass this information on to a utilizing device, and to regain a home position preparatory to another scanning operation in the least amount of time.

With the these and incidental objects in view, the invention includes certain novel features of construction and combinations of parts, a preferred form or embodiment of which is hereinafter described with reference to the drawings which accompany and form a part of this specification.

Figures 11, 12, 13, 14:
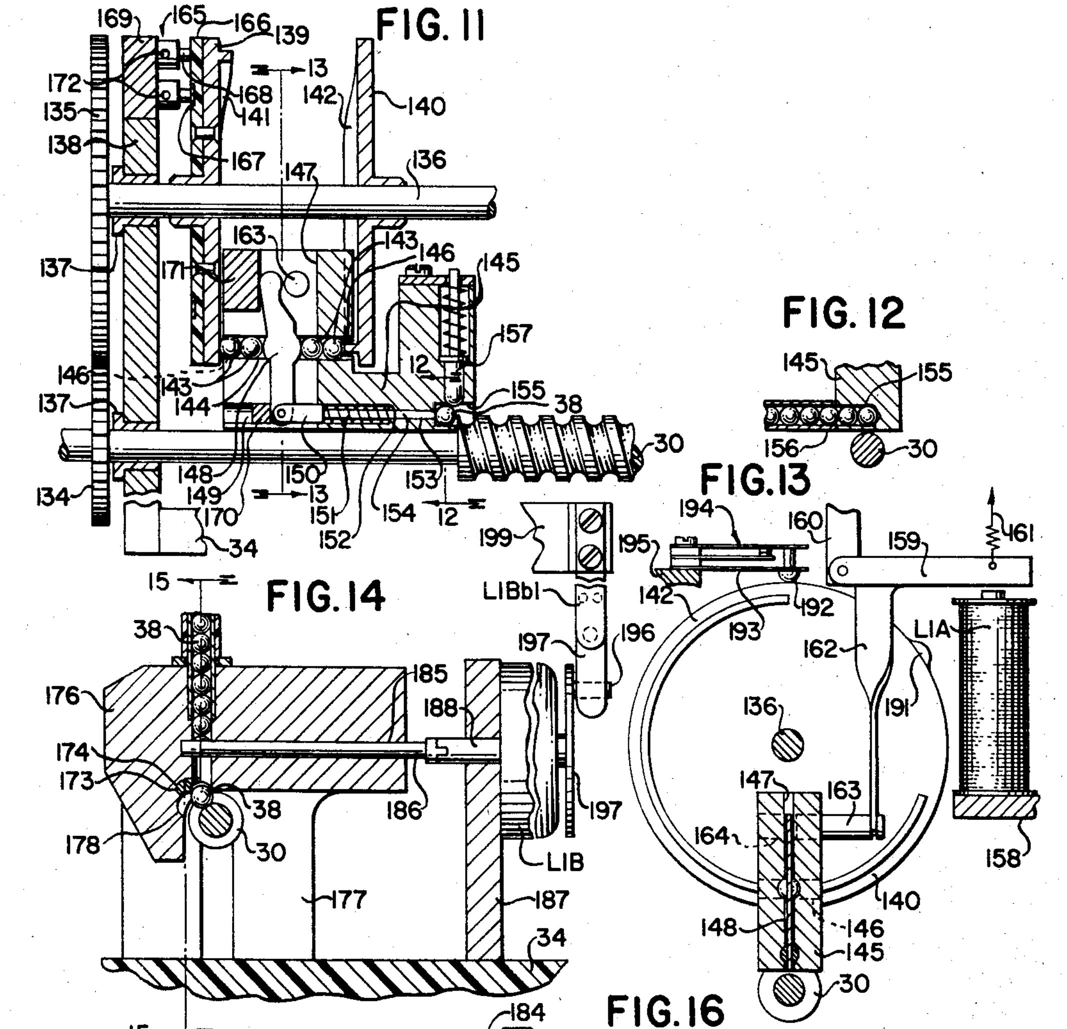

Figs. 11, 12, and 13 are views of an alternate type of interponent supply means which may be utilized with the invention as described herein.

Figures 15, 16:
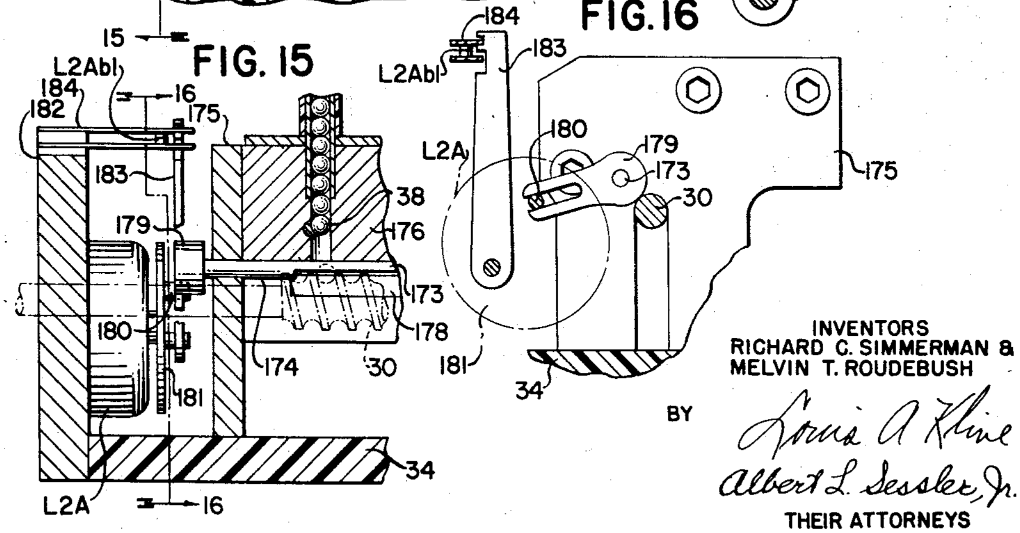

Figs. 14, 15, and 16 are views showing an alternate type of exit gate which may be used with the sequential switching mechanism.

Figure 17A:
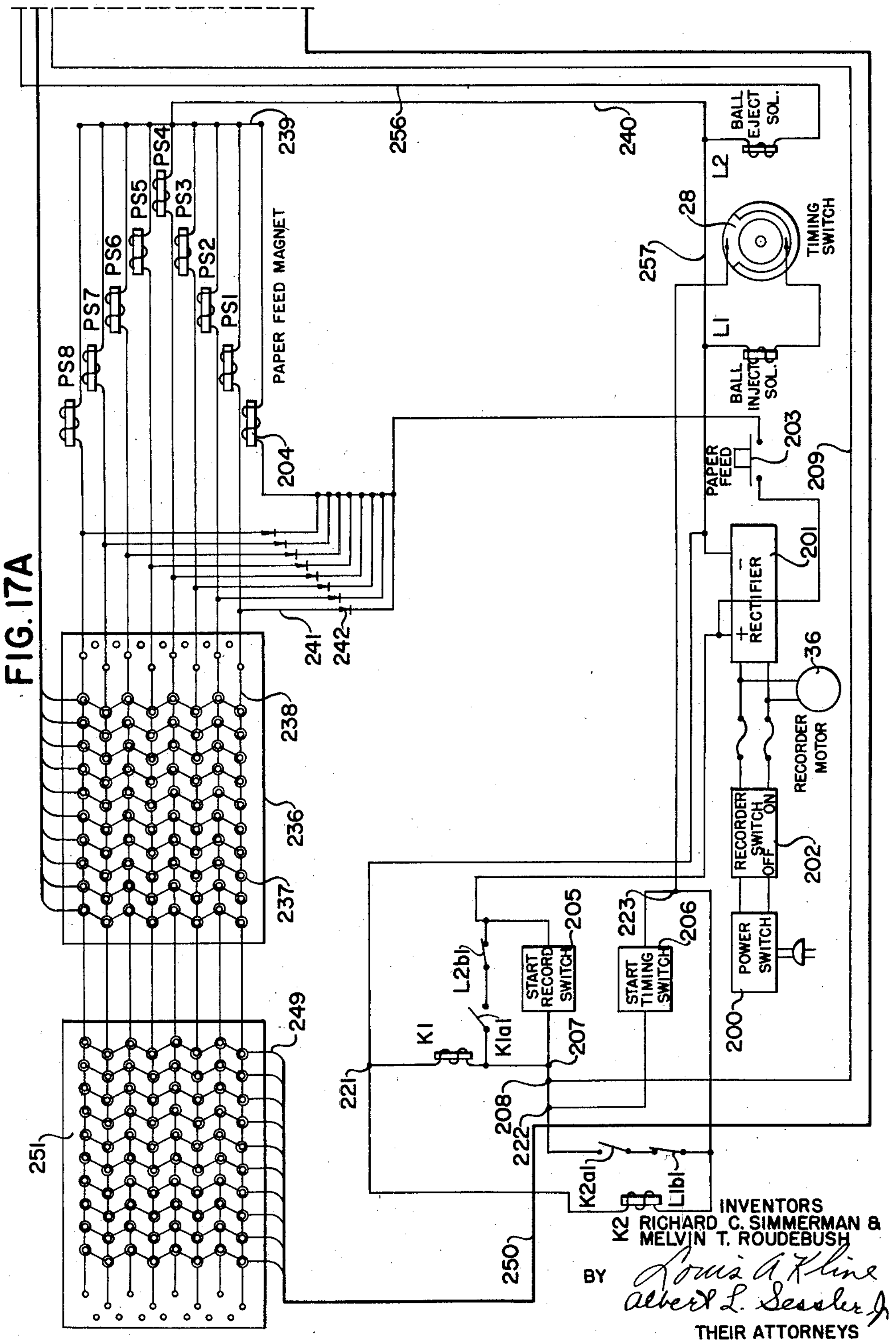
Figure 17B:
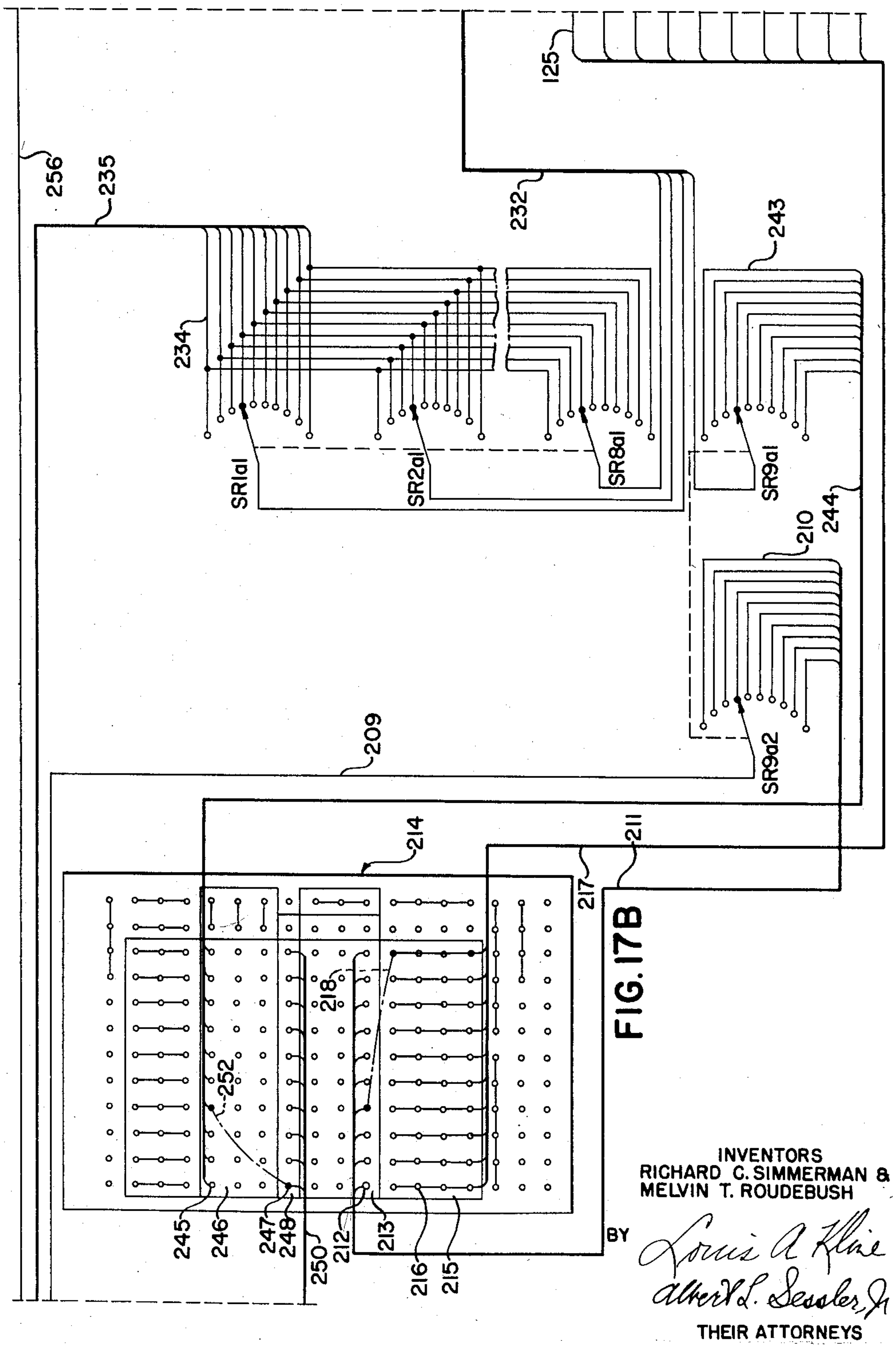
Figure 17C:
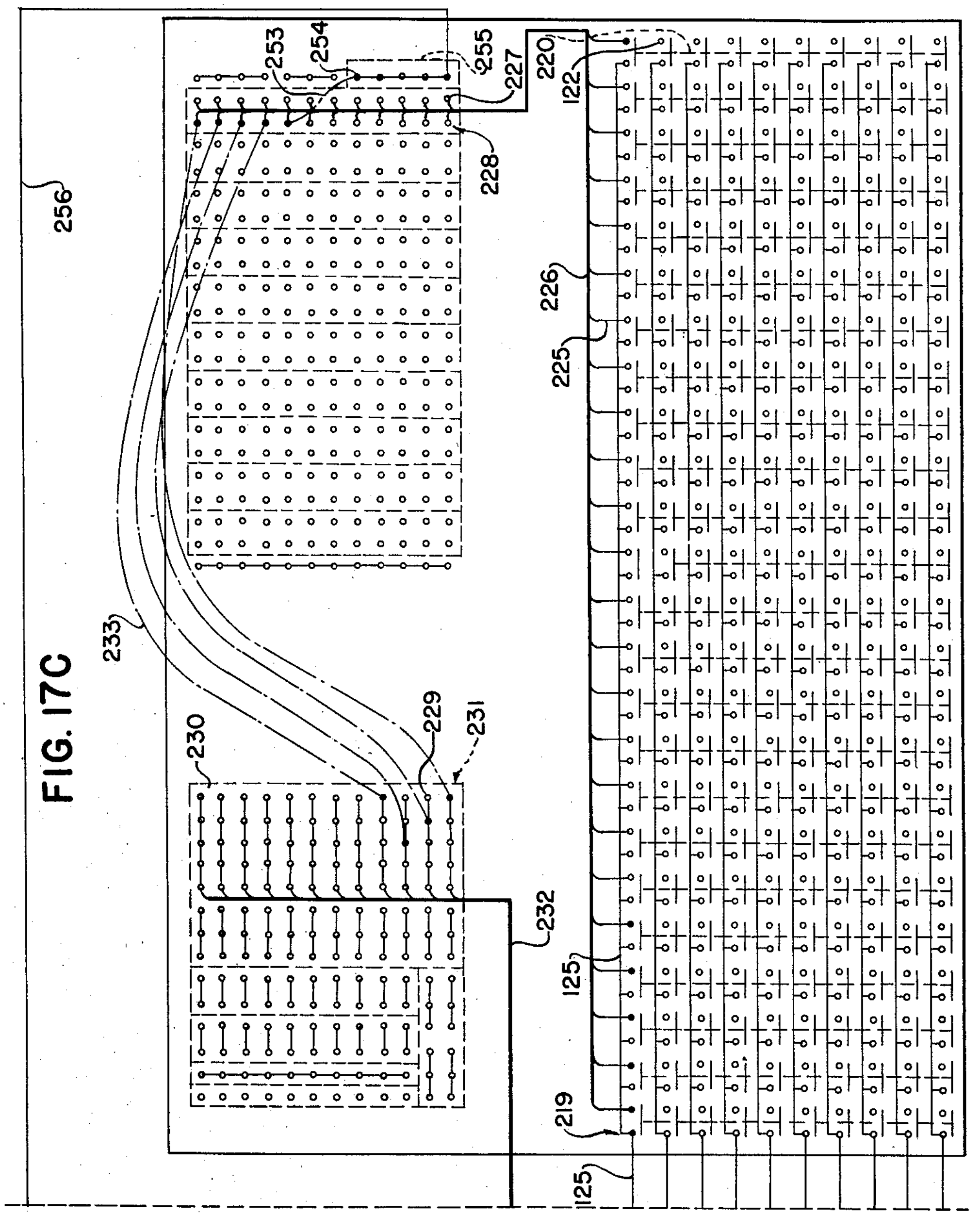

Figs. 17A, 17B, and 17C together form a circuit diagram showing one system in which the sequential switching mechanism of the present invention may be used.

In the novel switching mechanism, a lead screw 30 (Fig. 1) is rotatably mounted in bearings 31 secured in two members 32 and 33 fixed to a base 34 of the switching mechanism or serializer. The base 34 in turn is mounted on a platform 35. A motor 36 (Fig. 17A), acting through a gear train, the last gear of which is shown at 37 (Fig. 1), drives the lead screw 30 at a uniform rate continuously during the operation of the serializer.

A circular disc 20 (Figs. 1 and 9), of non-conducting material, is fixed by bolts 21 to the lead screw 30 near one end thereof. A conducting surface 22 is inlaid on one side of the disc 20 to cooperate with two wipers 23 and 24 secured to an end member 25 in turn fixed to the platform 35. Terminals 26 are provided on the wipers 23 and 24 for connection of appropriate wiring. During a given portion of each revolution of the lead screw 30, the disc 20 will be so positioned that both wipers 23 and 24 will contact the conducting surface 22, thereby completing a circuit between said wipers. The wipers 23 and 24, together with the surface 22, constitute a timing switch 28. The wipers 23 and 24 are also interconnected through a resistor 29 in series with a capacitor 27, for the purpose of suppressing any arcs resulting from the making or breaking of the contact between the wipers 23 and 24 and the conducting surface 22.

The lead screw 30 is shown herein as provided with a total of twenty-six threads, each comprising a raised thread face and a thread space of such size and shape as to receive an interponent 38 between adjacent thread faces and to advance said interponent in a line parallel to the longitudinal axis of the screw 30 as said screw is rotated by the motor 36. Of the twenty-six threads, one is used as a "gate-in" thread, twenty-four are used for switch-operating opsitions, and one is used as a "gate-out" thread. It will be understood that any desired number of threads may be provided on the lead screw 30, depending upon the number of switches employed, and that the use of twenty-six threads herein is merely illustrative.

The interponents 38 are preferably spherical in shape. Common ball bearings of appropriate size may be used as interponents if desired.

A block 39 (Fig. 1) is mounted adjacent the lead screw 30 by means of two legs 40 and 41, secured to the opposite ends of the block and fixed on the base 34. Formed in the block 39 is an elongated passage 42, contiguous to a portion of the periphery of the lead screw and parallel to the longitudinal axis of said lead screw.

Figures 8, 9, 10:
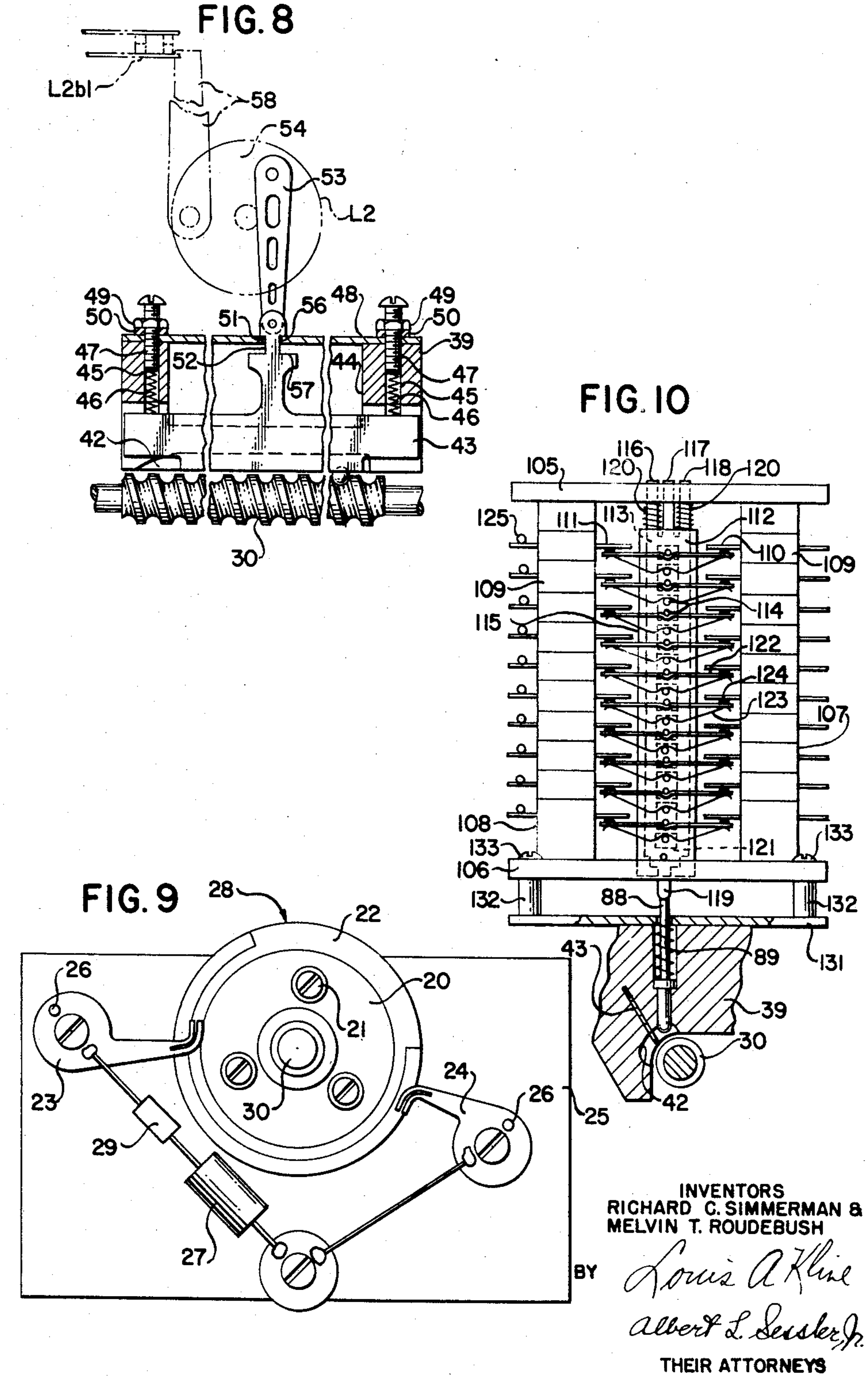
Fig. 8 is a sectional view taken on line 8—8 of Fig. 6, showing the exit gate and its operating means.
Fig. 9 is an end view of the lead screw, showing a rotary timing switch mounted thereon cooperating with brushes mounted on the frame for the sequential switching mechanism.
Fig. 10 is a detail view of an alternate type of switching unit which may be used with the sequential switching mechanism.

The block is slotted longitudinally, in a plane which intersects the passage 42, for receiving a slidable exit gate 43 (Figs. 6 and 8), and is recessed intermediate its ends, as shown at 44, on the side opposite the passage 42. As best shown in Fig. 8, a bore 45 is formed near each end of the block 39, and a spring 46, backed up by a bolt 47, threadedly engaged in said block, is located in each of the bores 45 to coact with the extremities of the gate 43 and thereby retain said gate in proper alinement. The bolts 47 also extend through a plate 48, secured over the recessed portion 44 in the block 39, and are adjustably secured in place by means of nuts 49. A washer 50 is positioned between each nut 49 and the plate 48. The bolts may be turned, if desired, to vary the tension of the springs 46 on the gate 43.

The plate 48 is provided intermediate its ends with an opening 51, through which an extension 52 of the gate 43 extends. At its upper end, the extension 52 is pivotally connected to a link 53, which is pivotally connected at its other end to an operating member 54 of a solenoid L2, of the rotary type, which is mounted on a bracket 55 (Fig. 1) secured to the base 34.

The solenoid L2 is operable to shift the exit gate 43 (Fig. 8) between a normal, extended, position, in which it effectively divides the passage 42 into two smaller channels, and a retracted position, in which it is withdrawn from the passage 42. Shoulders 56 and 57 on the extension 52 of the gate 43 cooperate with the edges of the opening 51 in the plate 48 to limit the extent of movement of the gate 43 in either direction. The operating time of the exit gate 43 is estimated to be between four and twelve milliseconds.

Also pivotally secured to the operating member 54 is an actuator 58, which shifts the lower blade of a set of normally-closed contacts L2*b*1, secured to the bracket 55, in response to movement of the solenoid L2, so that the contacts are closed when the exit gate 43 is in its normal, extended, position, but are opened when the gate 43 is shifted to its retracted position.

Means are provided to feed interponents 38 selectively into the passage 42, to be moved along said passage by the lead screw 30. A counter-bored opening 65 (Figs. 1, 4 and 5) in the block 39 receives a supply tube 66 therein and provides a passage from said tube to one end of the passage 42. A second tube 67 is positioned at the other end of the passage 42 to receive the interponents 38 after they have been advanced through said passage by the lead screw 30. The tube 67 is received at its other end in a counter-bored opening 68 in a block 69 secured by a bracket 70 to the top of the member 32. An anti-backup detent 71 is mounted in the block 69 to extend into the bore 68 and is urged into its extended position by a spring 72 in a bore 73 in the block 69 and adjustably retained at its other end by a bolt 74 in the bore 73 acting on the spring 72.

A third tube, 75, extends upwardly from the bore 68 parallel to the supply tube 66 and to approximately the same height. The tubes 66 and 75 are connected by a resilient tubular member 76, which may, if desired, take the form of an elongated, closely-wound coil spring. The member 76 is retained in proper coplanar relationship with the tubes 66 and 75 by means of two plates, 77 and 78, which embrace the member 76 and the upper ends of the tubes 66 and 75 on both sides. The plates 77 and 78 are secured on either side of a frame 79 fixed to the top of the member 32.

In assembly of the serializer, the interponent supply means, comprising the tubes 66, 67, and 75 and the resilient member 76, are filled with interponents 38, the number of interponents being sufficient to cause the resilient member 76 to be stretched or elongated and placed under tension.

An entry gate 80 (Figs. 1, 4 and 5) is mounted in a horizontal bore 81, which extends through the leg 40 into the block 39 and intersects the bore 65. The gate 80 is rotatable in the bore to control the entry of interponents 38 into the passage 42. As may best be seen in Figs. 4 and 5, the gate 80 is in the form of a rod having a concave face shaped to cooperate with the spherical surface of the interponents 38 and to captivate only one interponent at a time. An operating member 82 of a solenoid L1 (Figs. 1 and 7), fixed to the member 33, controls the operation of the gate 80 through a bifurcated member 83, which embraces an operating pin 84 on the operating member 82 and is hubbed to the gate 80.

Figure 4:
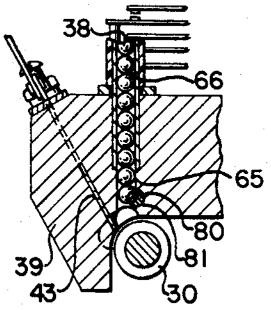
Fig. 4 is a sectional view taken on line 4—4 of Fig. 3, showing the interponent supply means and the entrance gate.
Figure 5:
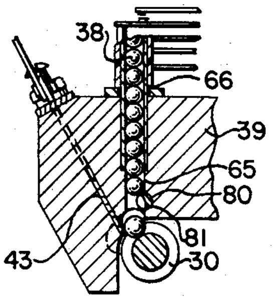
Fig. 5 is a sectional view similar to Fig. 4, showing the entrance gate in a different position immediately after an interponent has been fed into the switch-operating path and into cooperative relation with the lead screw.

A second operating pin 98 (Figs. 1 and 7) on the operating member 82 acts through a blade 99 to shift the longer blade of a set of normally-closed contacts L1*b*1, secured to the bracket 33, in response to movement of the solenoid L1, so that the contacts are closed when the entry gate 80 is in the blocking position, in which it is shown in Fig. 4, but are opened when said gate is shifted to the operated position, in which it is shown in Fig. 5.

In the normal, deenergized, state of the solenoid L1, the gate 80 is in the position in which it is shown in Fig. 4, in which it blocks passage of an interponent 38 into the passage 42, and in which its concave face is turned upwardly to coact with the lowermost of the interponents 38 in the bore 65. It will be noted that, since the resilient member 76 is under tension, due to the number of interponents 38 therein, there will always be an interponent 38 urged into engagement with the gate 80.

Figure 7:
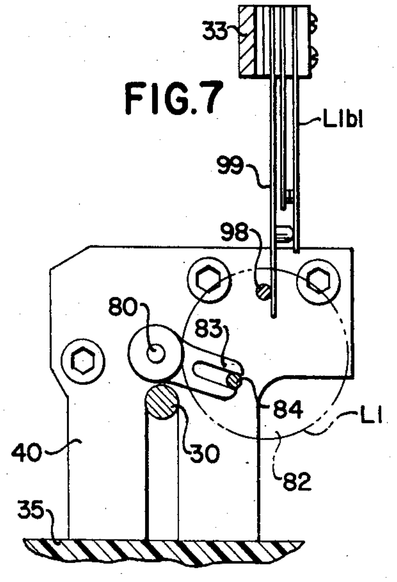
Fig. 7 is a sectional view taken on line 7—7 of Fig. 1, showing the solenoid-operated means for operating the entrance gate.

Energization of the solenoid L1 causes the operating member 82 and the pin 84 to be rotated clockwise, as viewed in Fig. 7, thus imparting a counter-clockwise movement to the bifurcated member 83 and the gate 80, and causing said gate to be rocked to the position in which it is shown in Fig. 5. During this movement of the gate 80, its concave face coacts with the lowermost interponent 38 to shift said interponent downwardly into the passage 42. At the same time, the gate effectively blocks the bore 65 to prevent movement of any additional interponents into the passage 42, as shown in Fig. 5. The estimated operating time of the entry gate 80 is between four and twelve milliseconds, the same as that of the exit gate.

Deenergization of the solenoid L1 causes spring means, associated therewith, to return the operating member 82, the pin 84, and the bifurcated member 83 to the position in which they are shown in Fig. 7, and to return the gate 80 to the position in which it is shown in Fig. 4. The gate is thus prepared to be operated to inject another interponent 38 into the passage 42 when the solenoid L1 is next energized.

Equally spaced apart and located in vertical coplanar relation to the longitudinal axis of the lead screw are a plurality of bores 85 (Figs. 2 and 3) in the block 39 corresponding to the maximum number of different positions of sequential operation which it is desired to control through the serializer or switching mechanism of the instant invention. Each of the bores 85 is counterbored to provide a shoulder 86 to coact with an enlarged annular portion 87 of an actuator 88, to limit the permissible downward movement of said actuator. One actuator 88 is provided for each bore 85 and is urged downward to a position in which its lower end protrudes into the passage 42 by means of a spring 89, which is compressed between the annular portion 87 and a plate 90, secured by bolts 91 to the top of the block 39. The plate 90 is provided with a plurality of openings 92, one for each actuator 88, to permit the upper end of the actuator to pass through said plate.

Mounted on a base 93, secured to the block 39, are a plurality of stacks of switch blades, one stack for each actuator. Each stack includes a plurality of sets of normally-open contacts, each set comprising a long blade 94 and a short blade 95. The long blades 94 of each stack are connected together by means of insulated connectors 96 and are operated by the corresponding actuator 88 through a stiff blade 97, which acts to damp any vibration of the blades 94 and 95 which might take place during the opening or closing of the contacts, due to their resilience.

The mechanical operation of the serializer to cause successive groups of contacts to be closed will now be briefly described. The manner in which various electrical controls are exerted to cause mechanical operations to take place at the desired time will not be explained at the present time but will be fully treated in the subsequent illustrative description of the use of the serializer in a data-recording system such as that shown in the circuit diagram of Figs. 17A, 17B, and 17C.

It will be assumed in this description that the lead screw 30 is being driven at a constant rate by the motor 36 through the previously-described gear train and that no interponents 38 are located in any part of the passage 42. To commence a sequential switching operation of the serializer, the solenoid L1 is briefly energized to shift the entry gate 80 from the position in which it is shown in Fig. 4 to the position in which it is shown in Fig. 5. This causes one, and only one, interponent 38 to be injected into the passage 42. Since the solenoid L2 (Fig. 8) is at this time deenergized, the exit gate 43 is in its extended position and therefore effectively divides the passage 42 into an upper channel and a lower channel, as may be seen in Figs. 2 and 6. The interponent 38 will be injected into the upper channel of the passage 42 and will be held therein by the extended gate 43. Injection of the interponent 38 is timed by electrical means, which will be described subsequently, so that said interponent will be injected into the space between adjacent thread faces on the lead screw 30.

Figure 1:
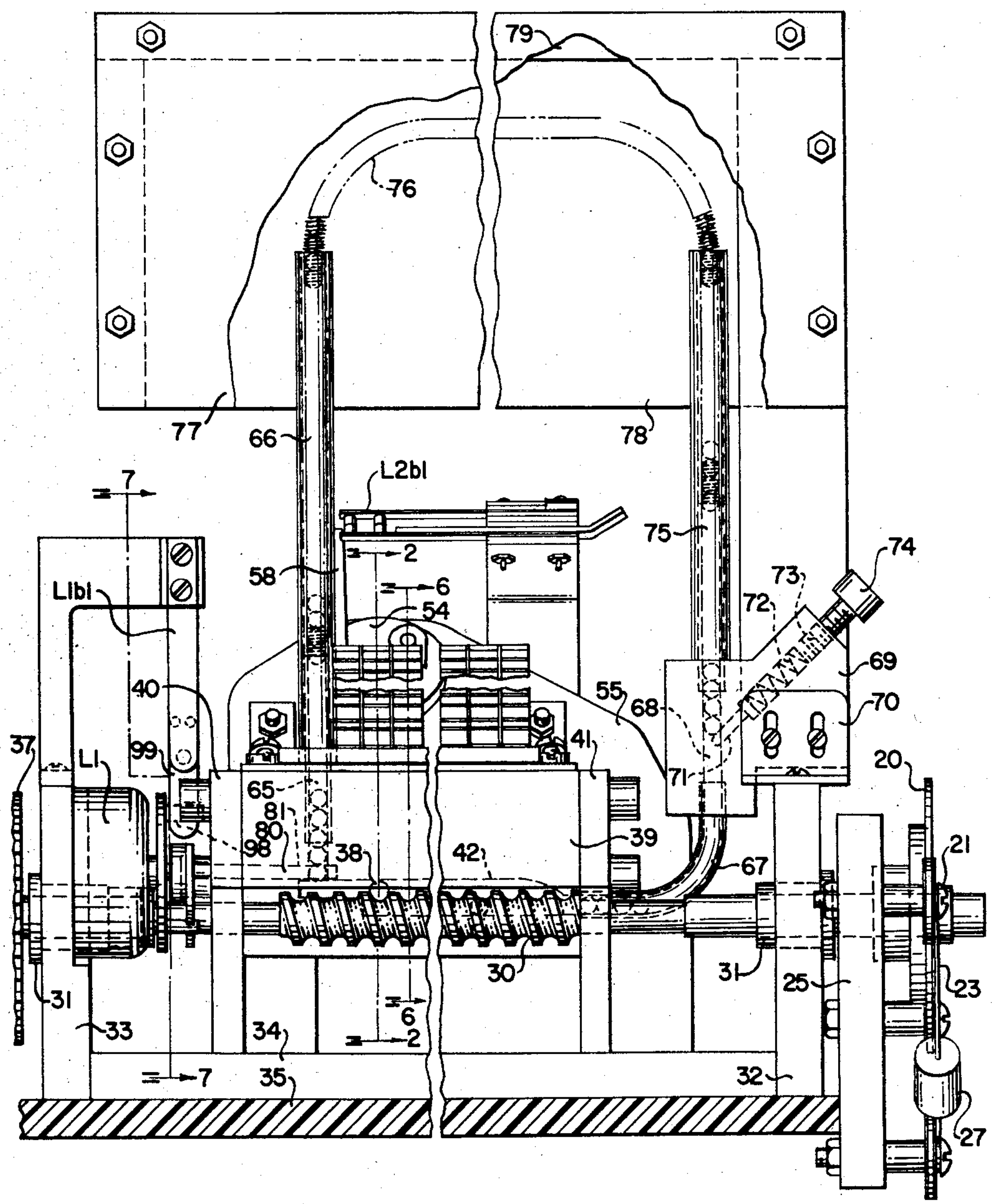
Fig. 1 is an elevation view of the novel sequential switching mechanism.
Figures 2, 3:
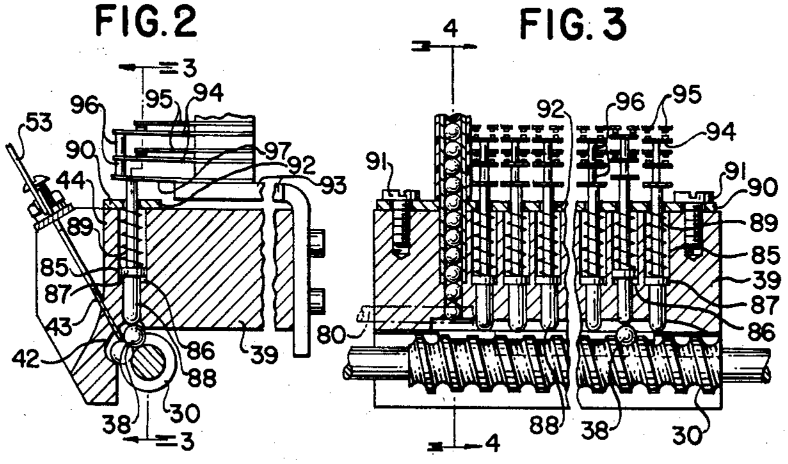
Fig. 2 is a sectional view taken on line 2—2 of Fig. 1, showing details of the switches and the switch-actuating means.
Fig. 3 is a sectional view taken on line 3—3 of Fig. 2, showing the switches, the actuators, and a portion of the interponent supply means.

Rotation of the lead screw 30 will then carry the interponent 38 through the upper channel of the passage 42 in a direction from left to right, as viewed in Figs. 1 and 3. As the interponent 38 is thus advanced by the screw, it will contact the protruding lower ends of successive ones of the actuators 88 and will shift said actuators upwardly against the force of the springs 89. Upward movement of the actuators 88 will be transmitted through the blades 97 and the connectors 96 to the long blades 94 of each group of contacts, thus shifting the blades 94 upwardly to close the corresponding sets of contacts. It will be seen that the actuators 88 will be shifted upwardly in successive serial order to close their corresponding sets of contacts as they are successively shifted by the interponent 38 in its movement through the upper channel of the passage 42, and will subsequently be returned to their normal, downwardly-extended, positions by their springs 89 as the interponent is carried past them by the lead screw 30.

Figure 6:
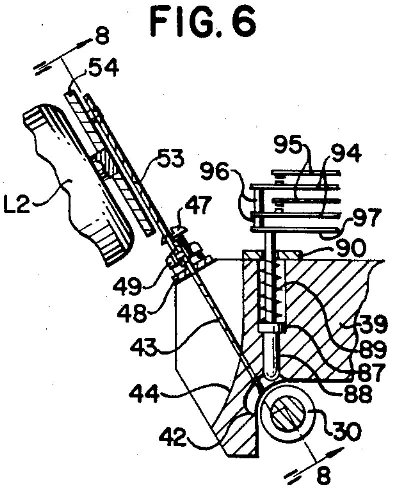
Fig. 6 is a sectional view taken on line 6—6 of Fig. 1, showing the exit gate and its operating means.

At a predetermined point in the travel of the interponent 38 through the upper channel of the passage 42, according to the number of successive sequential switching operations desired, the solenoid L2 (Fig. 8) will be energized. Energization of the solenoid L2 is effective, through the member 54 and the link 53, to shift the exit gate 43 from its normal extended position, in which it is shown in Figs. 2, 6 and 8, to a retracted position, in which it is removed from the passage 42. The interponent 38 will then be shifted, due to its frictional contact with the moving lead screw 30 and by the spring tension on the lower end of the actuator 88, which said interponent contacts, into the lower channel of the passage 42. The solenoid L2 will be deenergized after a very short period, causing the gate 43 to move back to its extended position, once more dividing the passage 42 into two channels. The interponent 38 which has just been shifted to the lower channel of the passage 42 will therefore be retained in said lower channel and will be advanced along said lower channel to the exit from the passage 42. During the time that the interponent 38 travels in the lower channel of the passage 42, it will not contact the lower ends of any of the actuators 88, and no more of the switch contacts of the serializer will therefore be closed.

As soon as the exit gate 43 has been retracted to permit an interponent to be shifted to the lower channel of the passage 42 and has then been shifted back to its extended position, the serializer is ready to receive another interponent 38 through the entry gate for commencement of another sequential switching operation, even while the previous interponent may still be traveling through the lower channel of the passage 42, below the gate 43, toward the exit from said passage.

It will thus be seeen that no resetting operation is required afteer one sequential operation before commencement of another, and that a second sequential switching operation may be commenced immediately following the completion of the previous one.

*Modified form of switch assembly*

A modified form of switch assembly, of the type shown in Fig. 10, may be used with the switch-operating mechanism of the instant invention, if desired.

A plurality of groups of switches, similar to the group shown in Fig. 10, which has ten different levels adapted to be actuated simultaneously by one of the actuators 88, are mounted between upper and lower plates 105 and 106, respectively, said plates extending the length of the switch assembly. One group is provided for each actuator 88, making a total of twenty-four groups in all, and the groups are spaced between the plates 105 and 106 according to the spacing of the actuators 88 in the block 39.

Each switch group includes a right column 107 and a left column 108 of insulating members 109 secured between the plates 105 and 106. The members 109 in the right and left columns 107 and 108 carry contact blades 110 and 111, respectively.

Slidably mounted in the plates 105 and 106, between the columns 107 and 108, is a switch operator 112, comprising a reinforcing and support member 113, a plurality of mounting rods 114, and a block 115, of insulating material, which is molded around and includes the member 113 and the rods 114. The support member 113 has fingers 116, 117, and 118 formed on its upper end, and a finger 119 formed on its lower end, integral therewith. These fingers coact with corresponding openings in the plates 105 and 106 to slidingly support the operator 112 between the plates 105 and 106. Springs 120, mounted on the fingers 116 and 118, normally urge the operator 112 downwardly to the position in which it is shown in Fig. 10. The support member 113 is also formed with a plurality of openings 121, through which the mounting rods 114 may pass.

Mounted between each adjacent pair of rods 114 are a bridging blade 122 and a retaining spring 123 for holding the blade 122 in proper position. Near each end, the blade 122 is provided with a contact 124, arranged to coact with the blades 110 and 111 in the operated position of the blade 122, to complete a connection between these blades. In the normal position of the operator 112, the blade 122, with its contacts 124, is spaced from both of the blades 110 and 111 to prevent a circuit from being completed between said blades. However, when the actuator 88 for this particular switch group is shifted upwardly by an interponent 38 passing beneath it, this movement will be transmitted to the operator 112 by the coaction of the finger 119 at the lower end of said operator with the upper end of the actuator 88, and all of the blades 122 for the group being actuated will be shifted upwardly to cause their contacts 124 to contact the blades 110 and 111. All of the bridging blades 122 will then connect their corresponding blades 110 and 111.

When the interponent 38 has passed from beneath the actuator 88, permitting said actuator to return to its normal position under the influence of the spring 89, the operator 112 will return to the position in which it is shown in Fig. 10 under the influence of the springs 120, thereby shifting the bridging blades 122 for the switch group downwardly and interrupting the connections between the blades 110 and 111.

As shown in Fig. 10, each of the blades 111 of the ten levels of the switching group is connected to a related common 125, which is also connected to the blades 111 of the corresponding level of all of the other switch groups. Customarily, as will be explained subsequently in the description of the circuit diagram, potential will be supplied to only one of the commons 125 during any single serializing operation. Then, as the bridging blades 122 for each switch group are successively shifted upwardly en masse, only that circuit will be completed through the switch group to the blade 110 which corresponds to the blade 111 whose common has been supplied with potential. A conductor or jumper wire may be used to connect the blade 110 to some other component of the electrical circuit. If desired, a program board may be fixed to the machine near the switch groups, and a plurality of movable jumper wires may be used to connect the blades 110 with appropriate sections in the program board. Such an arrangement has the advantage of flexibility and ease in the changing of programs, since any program may be varied at will merely by the movement of one or both of the end connectors of a jumper wire from one terminal to another, either of the switch group or of the program board or of both.

Mounting of the switch assembly on the block 39 may be accomplished by any suitable means, one of which is shown in Fig. 10. The plate 90, shown in Fig. 2, is replaced by a similar but larger plate 131, on which are secured a plurality of spacers 132. The spacers are of the correct height to permit the proper engagement of the actuator 88 with the lower end of the finger 119 on the operator 112 and are bored and tapped to receive bolts 133, which extend through holes in the lower plate 106 of the switch assembly. These bolts firmly anchor the plate 106 on the spacers 132 and thereby secure the switching unit in correct position on the block 39.

*Modified form of entry gate*

A modified form of entry gate, and operating means therefor, of the type shown in Figs. 11 to 13 inclusive, may be used in the instant invention in place of the entry gate of Figs. 1, 4 and 5, if desired. This modified form has the advantage of being so constructed that it is impossible for an interponent to be introduced into the passage 42 except when a thread space of the lead screw 30 is in proper position to receive said interponent. Even in the event of an electrical failure in the serializer, there is no chance that an interponent will be inserted when a thread face is in an interfering position, thus eliminating the possibility of jamming of the serializer from this source. The modified form of entry gate and operating means is of particular value when high-speed operation is required of the serializer, and also when the entry gate solenoid must be relied upon for long periods of use without the need of servicing or replacement.

As shown in Figs. 11 to 13 inclusive, the shaft of the lead screw 30 is extended at one end and is provided near that end with a gear 134, which meshes with a gear 135, secured to a shaft 136. Both the shaft of the lead screw 30 and the shaft 136 are mounted at their left ends, as viewed in Fig. 11, in bearings 137, fixed in an end member 138, secured to the member 34 of the serializer base. The right end (not shown) of the shaft 136 may be journaled in a conventional manner in the serializer framework.

The gears 134 and 135 are in the ratio of 1 to 2, so that, for every revolution of the lead screw 30, the shaft 136 makes one half of a revolution. This ratio is used, since it will never be required to inject an interponent into the first thread space of the lead screw 30 more often than once every two revolutions of said lead screw.

Secured to the shaft 136 are two complementary plate cams 139 and 140, having complementary cam surfaces 141 and 142. The surfaces 141 and 142 are arranged to coact with ball bearings or similar members 143 free in a bore 144 in a block 145, which may, if desired, be an integral extension of the block 39 used in the form of the invention shown in Figs. 1 to 9 inclusive, but will otherwise be a separate member mounted on the serializer base. Grooves 146 at either side of the block 145, which intersect the ends of the bore 144, are provided to receive the cam surfaces 141 and 142. The block 145 also has therein a slot 147, of a size to receive a lever 148, provided with an enlarged central portion normally positioned midway of the bore 144, between two of the ball bearings 143. At its lower end, the lever 148 extends into another bore 149 in the block 145. An operator 150 is located in the bore 149 and is pivotally connected to the lower end of the lever 148. Movement of the operator 150 to the left, as viewed in Fig. 11, is limited by a stop 170, fixed in the bore 149. A spring 151 extends between the operator 150 and a shoulder 152, defining the end of a reduced portion 153 of the bore 149, and normally urges the operator 150 to the left and retains it in the position in which it is shown in Fig. 11. A plunger 154 is integral with the operator 150 and extends through the reduced portion 153 to protrude slightly into an interponent supply passage 155 in the block 145. The interponent supply passage 155 is formed to extend from a point directly over the lead screw 30, as shown in Fig. 12, to an interponent supply tube 156, which is similar to the tube 66, shown in Fig. 1, and which, like the tube 66, forms part of a closed circuit interponent supply for the serializing mechanism.

The end of a spring-pressed detent 157, mounted in the block 145, also protrudes into the passage 155 and resiliently retains the interponents 38 against movement into the first thread space of the lead screw 30. Fixed to a serializer frame member 158 (Fig. 13), adjacent the block 145, is an entry gate solenoid, which may be designated L1A, since it serves the same function as the entry gate solenoid L1 of the form shown in Figs. 1 to 9 inclusive. The solenoid L1A, when energized, shifts an armature 159, which is pivotally mounted on a bracket 160 secured to the serializer frame, in a clockwise direction, as viewed in Fig. 13, against the force of a spring 161, secured to said armature. The spring 161 acts to return the armature 159 to the position in which it is shown in Fig. 13, after energization and subsequent deenergization of the solenoid L1A. However, it will be obvious that a positive means for returning the armature 159 to the position of Fig. 13 could be provided, if desired, such as a cam fixed to the shaft 136 and shaped to coact with a portion of the armature 159. An integral arm 162 on the armature 159 is pivotally connected to a blocking member 163 (Figs. 11 and 13), slidably mounted in a bore 164 in the block 145. The blocking member 163 is arranged to be shifted in the bore 164 in response to energization and deenergization of the solenoid L1A in a manner which will be described subsequently.

An additional blocking means in the form of a stopping block 171 is permanently fixed in the slot 147 for limiting the movement of the lever 148 to the left, as viewed in Fig. 11.

A timing switch 165, similar in function to the timing switch 28 of the form of the invention shown in Figs. 1 to 9 inclusive, is provided for use with the form of entry gate shown in Figs. 11 to 13 inclusive. The switch 165 comprises a plate 166, fixed to the plate cam 139 for rotation therewith and having a conducting surface 167, similar to the surface 22 (Fig. 9) of the switch 28, cooperating with brushes 168 secured to an insulating member 169, fixed to the top of the end member 138. Terminals 172 are provided on the brushes 168 for connection of appropriate wiring. During a given portion of each revolution of the shaft 136, the plate 166 will be so positioned that both of the brushes 168 will contact the conducting surface 167 on the plate 166, thereby completing a circuit between said brushes. The brushes 168 may also, if desired, be interconnected through a capacitor (not shown), for purposes of arc suppression, or, if desired, a capacitor may be applied to the operating circuit of the serializer as a whole, for purposes of arc suppression throughout the circuit.

Integral with the periphery of the plate cam 140 is a projection 191 (Fig. 13), which is arranged to coact once during each revolution of the cam 140 with an operator 192, which acts through a blade 193 to shift the longer blade of a set of contacts 194 fixed on a member 195, which is secured to the end member 138 (Fig. 11) to open said contacts for a brief period of time. In this form of the invention, the contacts 194 perform a function similar to that performed by the contacts **L1*b*1** in the form of the invention shown in Figs. 1 to 9 inclusive.

The manner in which the modified form of entry gate and operating means shown in Figs. 11 to 13 inclusive functions to inject an interponent 38 into the first thread space of the lead screw 30 will now be described.

As has been previously described, the lead screw 30 rotates continuously during operation of the serializer, and therefore the shaft 136, which is geared to the lead screw 30, will also rotate continuously at a speed which is one half that of the lead screw 30, as will the plate cams 139 and 140, secured to the shaft 136. The complementary cam surfaces 141 and 142 cooperate with the ball bearings 143 to shift the lever 148 about its pivot on the operator 150, which is resiliently held in the position in which it is shown in Fig. 11 by the spring 151.

When it is desired to inject an interponent 38 into the first thread space of the lead screw 30 to commence a sequential switching operation, the solenoid L1A is energized, thus rocking the armature 159 clockwise, as viewed in Fig. 13, and shifting the blocking member 163 into the path of movement of the upper end of the lever 148. Now, the next time the lever 148 is shifted by the ball bearings 143, under the influence of the cam surfaces 141 and 142, said lever will not be able to rock about its pivot on the operator 150 and will, instead, rock about the point of its contact with the blocking member 163, which has become the fulcrum for the lever 148. This causes the lower end of said lever to shift to the right, as viewed in Fig. 11, carrying the operating member 150 and the plunger 154 to the right also. The free end of the plunger 154 will thus be projected into the passage 155 and will force an interponent 38, positioned there, past the flexible detent 157 and into the first thread space of the lead screw 30. As the plunger 154 is withdrawn from the passage 155 by the spring 151, another interponent 38 will be forced into said passage by the resilient tubular member in the interponent supply circuit, such as the member 76, shown in Fig. 1. This interponent will, however, be prevented from entering the first thread space of the lead screw by the detent 157 and will be held in the passage 155 until the next movement of the plunger 154 into the passage 155.

The time of energization of the solenoid L1A is regulated by the timing switch 165 (Fig. 11), so that said solenoid remains energized long enough to permit the blocking member 163 to act as a fulcrum for the lever 148 during a given portion of the revolution of the complementary cams 139 and 140. In the instant embodiment, said cams are constructed to have a dwell of 144 degrees, a rise of 108 degrees, and a fall of 108 degrees. During a revolution in which it is desired to inject a ball, the solenoid L1A is energized, so as to shift the member 163 into blocking position during the dwell time of the cams 139 and 140, and said solenoid remains energized during the rise time of said cams and is deenergized so as to return the member 163 to non-blocking position during the fall time of the cams.

It will be seen that, since the configuration of the surfaces 141 and 142 of the cams 139 and 140, which are geared to the lead screw 30, controls the time at which an interponent 38 is injected into the first thread space of said lead screw, there is no possibility of an interponent's being injected against a thread face to cause an interference which might jam the machine.

*Modified form of exit gate*

A modified form of exit gate, and operating means therefor, of the type shown in Figs. 14 to 16 inclusive, may be used in the instant invention in place of the one shown in Figs. 1 to 9 inclusive, if desired. This modified form has the advantage of greater structural rigidity and more positive operation than the form of exit gate shown in the embodiment of Figs. 1 to 9 inclusive.

In the modified form, an exit gate 173 (Figs. 14 and 15), in the form of a rod having a flat surface thereon, is rotatably mounted in a horizontal bore 174, which extends through a leg 175 into a block 176. The block 176 is mounted adjacent the lead screw 30 by means of the leg 175 and a leg 177, which are secured to opposite ends of the block 176 and are fixed on the base 34. The legs 175 and 177 and the block 176 are similar in configuration to corresponding parts in the form of the invention shown in Figs. 1 to 9 inclusive. The bore 174 is contiguous to a passage 178, similar in form and cross-section to the passage 42 in the block 39 (Fig. 1). The bore 174 extends the length of the passage 178.

A bifurcated member 179 (Figs. 15 and 16), fixed to the left end of the gate 173, as viewed in Fig. 15, cooperates with an operating pin 180 on an operating member 181 of a solenoid which may be designated L2A, since it is similar in function to exit gate solenoid L2 of the form of the invention shown in Figs. 1 to 9 inclusive, and which is mounted on a member 182, fixed to the serializer base 34.

In the normal, deenergized, state of the solenoid L2A, the exit gate 173 is positioned as shown in Figs. 14 and 15 to block movement of interponents 38 from the upper switch-actuating channel of the passage 178 to the lower channel of said passage. Energization of the solenoid L2A, which is effected in a manner subsequently disclosed in the explanation of the circuit diagram of Figs. 17A to 17C inclusive, by the closing of a predetermined one of the switches operated by the switch actuators, causes the operating member 181 and the pin 180 to be rotated clockwise, as viewed in Fig. 16, thus imparting a counter-clockwise movement to the bifurcated member 179 and the exit gate 173 and causing said gate to be rocked to a position in which it is ineffective to block movement of an interponent 38 from the upper channel of the passage 178 to the lower channel of said passage. In the non-blocking position of the gate 173, the flat surface thereon forms a smooth continuation of the surface of the passage 178, so that said gate offers no obstruction to movement of the interponent 38 into the lower channel of the passage 178, said movement being caused by means of the frictional contact of said interponent with the moving lead screw 30, and by means of the spring tension on the lower end of the switch actuator (not shown), which has been operated to energize the solenoid L2A by said interponent. Subsequent deenergization of the solenoid L2A causes the gate 173 to be returned to the position in which it is shown in Fig. 14, thereby once more dividing the passage 178 into two separate channels.

A switch-operating member 183 (Figs. 15 and 16) is pivotally secured to the operating member 181 of the solenoid L2A and is notched at its upper end to cooperate with an upper blade 184 of a set of normally-closed contacts which are mounted on the member 182 and which may be designated L2A*b*1, since they are similar in function to the normally-closed contacts **L2*b*1 controlled by the exit gate solenoid L2 in the form of the invention shown in Figs. 1 to 9 inclusive. When the solenoid L2A is energized, the resulting clockwise rotation of the member 181, as viewed in Fig. 16, causes the switch-operating member 183 to be shifted upwardly, thereby lifting the blade 184** of the contacts L2A*b*1 and opening said contacts. Subsequent deenergization of the solenoid L2A returns the switch-operating member 183 to the position in which it is shown in Fig. 16, thereby reclosing the contacts L2A*b*1.

When the form of the exit gate shown in Figs. 14 to 16 inclusive is used with the form of entry gate of Figs. 1 to 9 inclusive, it may be desired to relocate the entry gate to provide more clearance between the gates and to avoid crowding the operating solenoids. As shown in Fig. 14, there are provided a bore 185 and an entry gate 186, which is positioned therein. While very similar to the entry gate 80 and the bore 81 of the form of the invention shown in Figs. 1 to 9 inclusive, the bore 185 and the gate 186 have been shifted ninety degrees in a horizontal plane and displaced upwardly a small distance in the block 176. In Fig. 14, the operating solenoid L1B, which is similar to the solenoid L1 of Figs. 1 to 9 inclusive, is mounted on a support 187, fixed to the base 34, and is connected to the gate 186 for the operation thereof by means of a connector 188.

An operating pin 196 on an operating member 197 of the solenoid L1B acts through a blade 198 to shift the longer blade of a set of normally-closed contacts L1B*b*1, fixed on a member 199, secured to the serializer frame, in response to movement of the solenoid L1B, so that the contacts are closed when the entry gate 186 is in its blocking position, but are opened when said gate is shifted to its operated position. It will be seen that the contacts L1B*b*1 are similar in function to the contacts L1*b*1, shown in Figs. 1 and 7.

The manner in which the entry gate 186, the exit gate 173, and the contacts L2A*b*1, in the form of the invention shown in Figs. 14 to 16 inclusive, function in the operation of the serializer is the same as the manner in which corresponding parts function in the form of the invention shown in Figs. 1 to 9 inclusive.

*Circuit diagram*

A circuit diagram embodying a data-recording system of the type in which information is punched on paper tape and in which the sequential switching device or serializer of the instant invention might be used is shown in Figs. 17A to 17C inclusive. In these figures, certain switches which are mere duplicates of others, such as switches similar to the differentially-controlled selector switches SR1*a*1, SR2*a*1, and SR8*a*1 (Fig. 17B), have been omitted, since their operation is substantially the same as that of the ones shown and will be clear from the explanation of the ones which are shown.

Also, the physical or mechanical counterparts of many of the electrical elements shown in the circuitry, such as the tape-punching and tape-handling mechanism and the parent data input machine, are not specifically disclosed in this application but are of the type disclosed in other applications, such as the John H. Burns et al. United States application Serial No. 488,636, filed February 16, 1955, now Patent No. 2,878,872, patented March 24, 1959, and the Elmer A. Gerdemann United States application Serial No. 550,728, filed December 2, 1955, now Patent No. 2,896,713, patented July 28, 1959.

In this explanation, the circuits will be described as they function in preparing the apparatus for operation and in carrying out typical operations of the apparatus. It will be assumed that the components of the data-recording system have been previously operated through a complete transaction and are in a "home" position, ready to receive the entries of a new transaction.

Power is made available to the system by the closing of a power switch 200 (Fig. 17A). Operation of this switch closes a circuit to make the usual 110-volt 60-cycle alternating current available to the parent machine motor circuit (not shown), to the recorder motor 36, and to a rectifier 201, through a "recorder on-off" switch 202, when the switch 202 is in its "on" position.

It may be desired at this time to cause a "run-in" symbol to be punched on the tape. To accomplish this, a push button or other control member controlling a run-in switch 203 is depressed, completing a circuit from the plus side of the rectifier through the run-in switch 203 and a paper feed magnet 204 to energize said magnet for the feeding of the record tape and the punching of sprocket holes therein. The punching of sprocket holes only in the record tape may constitute a "run-in" symbol according to a predetermined code.

To initiate a cycle of operation of the data-recording system, the data to be recorded is set up on the keyboard of the data input machine, and said machine is tripped, causing it to cycle and thereby causing a cam-controlled "start record" switch 205 (Fig. 17A) and a cam-controlled "Start timing" switch 206 (Fig. 17A) to close at predetermined points in the cycle of operation of the machine.

The closing of the "start record" switch 205 completes a circuit from the plus side of the rectifier 201 through the "start record" switch 205, point 207, a relay K1, which may be physically located in the parent machine or elsewhere as desired, and a point 221 back to the minus side of said rectifier, thereby energizing the relay K1. This causes the normally-open contacts K1*a*1 (Fig. 17A) to close, completing a holding circuit around the switch 205, over then ormally-closed contacts L2*b*1, which are controlled by the exit gate solenoid L2, and over the contacts K1*a*1, which are now closed.

From the point 207, potential is supplied, initially through the "start record" switch 205, which is closed during only a short time of the cycle of the parent machine, and subsequently through the contacts L2*b*1 and K1*a*1, through points 208 and 222, through the "start timing" switch 206 and through a point 223 to the timing switch 28, which, it will be recalled, is mounted on the lead screw 30, for rotation therewith. The timing switch 28 is fixed to the lead screw 30 in such relation that it completes a circuit to energize the entry gate solenoid L1 at the proper time to cause the entry gate 80 to inject an interponent 38 into the passage 42 between adjacent thread faces of the lead screw 30, so that the interponent does not stumble on one of the thread faces to cause an interference which could jam the machine.

From point 223, a circuit is also completed through a relay K2 and the point 221 back to the minus side of the rectifier 201. The relay K2, which may be physically located in the parent machine or elsewhere as desired, is thereby energized. This causes the normally-open contacts K2*a*1 to close, completing a holding circuit around the "start timing" switch 206 over the contacts K2*a*1 and the normally-closed contacts L1*b*1, controlled by the movement of the entry gate solenoid L1. As the solenoid L1 completes its energizing movement as described above, it causes the contacts L1*b*1 to open, thereby interrupting the holding circuit for relay K2 and causing said relay to deenergize. This arrangement insures that potential is supplied to the timing switch 28 for a sufficiently long period to enable the solenoid L1 to be energized, and also insures that the potential to the switch 28 will be cut off once the solenoid L1 has been energized.

The inserted interponent 38 now begins its movement through the upper channel of the passage 42 in the manner previously described.

Potential is also supplied through the points 207 and 208 and a conductor 209 to the wiper of a differentially settable program selector switch SR9*a*2 (Fig. 17B), the setting of which is controlled from the keyboard of the parent machine. Each of the several contacts of the switch SR9*a*2 is connected over a conductor 210 in a cable 211 to a corresponding terminal 212 in a program selection section 213 on a parent machine program selection board 214 (Fig. 17B).

Also provided on the selection board 214 is a program section 215, the terminals 216 of which are connected by conductors in a cable 217 to the respective commons 125 (Figs. 17B and 17C) of corresponding levels 1 to 10 in a switching member 219 (Fig. 17C), which in this circuit diagram is shown as being of the type shown in Fig. 9 and previously described in this specification as an alternate form. A plug board connector 218 may be used to connect any desired one of the terminals 212 in the section 213 to any desired terminal 216 in the section 215.

As has been described, the movement of the interponent 38 through the upper channel of the passage 42 causes the switches of all levels in successive groups in the switching member 219 of the serializer to be closed. In Fig. 17C, the bridging blades 122 for each of the various levels are shown to be connected together by the dashed line 220 for movement in unison. In the switching member 219, shown in Fig. 17C, there are twenty-four groups, each having ten levels, but it is obvious that the number of groups or levels could be incerased or decreased if desired. The commons 125 which are provided for each common level of the switching member 219 are shown as connected to the left-hand terminal of each of the switches in the switching member, as viewed in Fig. 17C. The right-hand terminal in each of the twenty-four switches of each level of the switching member 219 is connected by a conductor 225 in a cable 226 to a corresponding terminal 227 in a first recorder program board 228, in the manner shown for the first level only in Fig. 17C.

Terminals 229 in a readout section 230 of a second recorder program board 231 are bussed together by rows, and each row is connected by conductors 232 to the wipers of selector switches SR1*a*1 to SR8*a*1 inclusive (Fig. 17B), which are differentially settable according to the amount set up in the corresponding row of the keyboard of the data input machine. It will be seen that the terminals 227 of the board 228 may be connected to the terminals 229 in the readout section 230 in any desired arrangement by plug board connectors 233, so that, as successive switches in a given level of the switching member 219 are closed, potential will be supplied through successive terminals 227, plug board connectors 233, terminals 229, and conductors 232 to the wipers of the selector switches SR1*a*1 to SR8*a*1 inclusive, in any desired order or sequence according to the program which has been set up.

Corresponding position contacts for the selector switches SR1*a*1 to SR8*a*1 inclusive are all electrically connected to ten corresponding conductors 234 in a cable 235; that is, all of the "1" contacts are connected together, as are all of the "2" contacts, etc.

The conductors 234 terminate in ten different lines on a diode digit encoding board 236 (Fig. 17A), corresponding to the ten digits from 0 to 9. The ten lines are intersected by, but electrically isolated from, eight rows corresponding to eight channels used in recording of data on recording tape. At each point of intersection is a socket 237, in which a diode may be inserted to connect the line to the row. Each row is connected to a conductor 238, which is connected at its other end to a corresponding one of the punch-selecting magnets PS1 to PS8 inclusive. Said magnets in turn are connected to a common 239, which is connected to the minus side of the rectifier 201 by a conductor 240.

Energization of one of the punch-selecting magnets PS1 to PS8 inclusive causes a perforation to be made in the corresponding channel of the recording tape. Passage of current through the circuit described above from the wiper of the program selector switch SR9*a*2 causes punch-selecting magnets to be energized according to the program selected and the information set upon the parent machine for the punching of data on the tape. In addition, when any one of the punch-selecting magnets is energized, the paper feed magnet 204 will also be energized through a conductor 241 and an isolating diode 242 in said conductor. Each one of the eight conductors 238 from the diode digit board to the punch magnets is connected to the paper feed magnet 204 through one of the conductors 241 and its isolating diode 242. Energization of the paper feed magnet 204 causes the recording tape to be advanced one increment in preparation for the next punching operation.

The contacts of the selector switch SR9*a*1, which, like the program selector switch SR9*a*2, is controlled by the transaction control means of the parent machine, are connected by conductors 243 and a cable 244 to corresponding terminals 245 in a section 246 of the register selection board 214.

Terminals 247 in an adjacent special symbol section 248 of the selection board 214 are connected to conductors 249 in a cable 250, which conductors terminate in ten lines on a diode symbol encoding board 251. Eight rows on the board 251 are electrically connected through the eight rows on the diode digit encoding board 236 and the eight conductors to the punch-selecting magnets PS1 to PS8 inclusive. It will be seen that, by connecting terminals 245 in the section 246 of the board 214 to terminals 247 in the section 248 of said board by means of plug board connectors such as 252, and by inserting diodes in the diode symbol encoding board 251 to connect the lines corresponding to the various conductors 249 with the rows according to a predetermined code, data corresponding to the position of the switch SR9*a*1 will be punched on the tape.

For additional details pertinent to the construction and operation of the diode encoding boards and the punch-selecting magnets, as well as the manner in which these are rendered effective to cause perforation of the recording tape according to a predetermined code, reference may be had to the previously-cited application of Elmer A. Gerdemann.

As has been stated, all of the switch contacts of each level of the switching member 219 are connected through conductors 225 in a cable 226 to corresponding terminals 227 on the board 228, and each of these terminals is in turn connected by plug board connectors 233 to a readout section 230 of the board 231. In each programmed section of the board 228 corresponding to the various levels of the switching member 219, the terminal 227 following the last successive terminal required for setting up the desired program for that level is connected by a plug board connector 253 to a terminal 254 in an exit gate section 255 of the board 228. A conductor 256 is common to all of the terminals 254 in the section 255 and is connected to the exit gate solenoid L2 (Fig. 17A), which in turn is connected to a conductor 257 leading to the minus side of the rectifier 201. It will therefore be seen that the exit gate solenoid L2 is energized, over the path described above, immediately following the recording of the last character of information required by the selected program. As has been previously described, energization of the solenoid L2 causes the exit gate 43 to be retracted out of the passage 42, and the interponent 38 is then shifted to the lower channel of said passage, in which it is inoperative to cause any additional switches of the switching member 219 to be closed.

This movement of the gate 43 also causes the contacts L2*b*1 (Fig. 17A) to open, thereby interrupting the energizing circuit for the relay K1 and causing deenergization of said relay and consequent opening of the contacts K1*a*1. Opening of the contacts L2*b*1 also interrupts the operating circuit which extends to and through the wiper of the program selector switch SR9*a*2. Since the solenoid L2 is energized over this circuit, the interruption of the circuit will cause said solenoid to be deenergized. The solenoid L2 is, in effect, therefore, a self-interrupting solenoid.

It will be realized that the energizing circuit for the solenoid L2 would in any event be interrupted by the opening of that switch in the member 219 which originally caused the solenoid L2 to be energized. In fact, the opening of that switch takes place only a very short time after the opening of the contacts L2*b*1, but it is desirable that the deenergization of the solenoid L2 be controlled by its contacts L2*b*1 to insure that the solenoid has been effective to cause proper operation of the exit gate 43.

Since deenergization of the solenoid L2 recloses the contacts L2*b*1, the recording system is thereby placed in condition to begin another recording operation, which is initiated by operation of the parent machine in the manner previously noted.

The circuit has been described in connection with the solenoids L1 and L2 of Figs. 1 to 9 inclusive, but it is obvious that solenoids L1A and L1B and L2A could be substituted in the circuit and the various mechanisms operated thereby could function to produce the same serializing operation as explained with reference to Figs. 1 to 9 inclusive.

While the forms of the invention shown and described herein are admirably adapted to fulfill the objects stated, it is to be understood that it is not intended to confine the invention to the forms or embodiments disclosed herein, for it is susceptible of embodiment in various other forms.

What is claimed is:

1. A sequential switching device comprising, in combination, actuating means; means for advancing the actuating means selectively along either a first or a second of two different paths; contact-operating means cooperable with the actuating means for operating contacts of the switching device by the actuating means when said actuating means is moved in the first path; and control means operable to enable the actuating means to be shifted from the first path to the second path to terminate the operation of the contacts at any desired time during its movement along said first path.

2. A sequential switching device comprising, in combination, a housing; a lead screw; means for mounting the lead screw in operative relation to the housing; means for driving the lead screw; a channel in the housing contiguous to the lead screw and parallel to its longitudinal axis; an interponent positioned in the channel and advanced by the lead screw; a plurality of contact-actuating means mounted in the housing and having portions projecting into the channel, the interponent coacting with the contact-actuating means serially as said interponent is advanced to cause switch contacts to be sequentially actuated by the contact-actuating means, and means operable to enable the interponent to be shifted out of the channel at any selected point of its advance to terminate the sequential actuation of the switch contacts.

3. A sequential switching device comprising, in combination, a housing; a lead screw; means for mounting the lead screw in operative relation to the housing; means for driving the lead screw; a passage in the housing contiguous to the lead screw and parallel to its longitudinal axis; a shiftable keeper, in its operative position dividing the passage into two channels; means for shifting the keeper between operative and inoperative positions; an interponent positioned in said passage and advanced by the lead screw; a gate for admitting interponents into said passage to be advanced by the lead screw; and a plurality of contact-actuating means mounted in the housing and having portions projecting into the passage, the interponent when in a first channel of the passage coacting with the contact-actuating means serially as said interponent is advanced to cause switch contacts to be sequentially actuated by the actuating means, the keeper being shiftable at any desired time to enable said interponent to be shifted from said first channel of the passage to a second channel, in which it will not operate the actuating means as it is advanced by the lead screw.

4. The sequential switching device of claim 3 in which the gate is at one end of the passage; an exit at the other end of said passage; and a conduit containing a plurality of interponents extending between the exit and the gate, so that each interponent, after being advanced through the passage, can be returned through the conduit to the gate for subsequent re-use.

5. The sequential switching device of claim 4 in which the conduit includes a spring which is distended to urge the interponent in the conduit adjacent the gate into engagement with the gate.

6. The sequential switching device of claim 5 in which the gate comprises a valve in the conduit for releasing the interponents one at a time for introduction into the passage.

7. The sequential switching device of claim 4 in which retaining means are provided in the conduit for preventing reverse movement of the interponents from the conduit through the exit into the passage.

8. A sequential switching device comprising, in combination, a housing; a passage through said housing; an interponent in said passage; means for advancing the interponent through said passage; a keeper to control the movement of the interponent through the passage in one or the other of two different paths; actuating means for actuating contacts of the switching device, each actuating means having a portion projecting into the passage in such manner as to be contacted serially by the interponent moving through the passage in one of the paths; and keeper-operating means for shifting the keeper to enable the interponent to change from one path to the other at any desired time during advancement of the interponent through the passage, so that said interponent can be controlled to be effective to actuate any desired number of switch contacts in succession during its advancing movement through the passage.

9. A sequential switching device comprising, in combination, a housing; a passage through said housing; an interponent in said passage; means for advancing the interponent through said passage in one or the other of two different paths; control means operable to enable the interponent to be shifted from one path to the other at any desired time during its movement through the passage; and contact-operating means for operating contacts of the switching device, cooperating with said interponent and operated thereby when said interponent is moved in said one path past the means to cause the contacts to be operated in sequential order, the number of contacts operated in sequential order being dependent upon the time at which the control means is operated to enable the interponent to be shifted from said one path to said other path during its movement through the passage.

10. The sequential switching device of claim 9 in which the control means comprises a plate slidably mounted in said housing and operable between an extended position, in which it divides said passage into two channels corresponding to the two different paths, and a retracted position, in which it is withdrawn from said passage.

11. The sequential switching device of claim 9 in which the control means comprises a flatted rod rotatably mounted in said housing and operable between a first position, in which it divides said passage into two channels corresponding to the two different paths, and a second position, in which it is ineffective to divide said passage.

12. The sequential switching device of claim 9 including gating means for introducing an interponent into one end of the passage at selected times; an exit at the other end of the passage; and a conduit extending between the exit and the gating means, so that the interponent, after being advanced through the passage, can be returned through the conduit to the gating means for subsequent re-use.

13. The sequential switching device of claim 12 in which the gating means is a valve.

14. The sequential switching device of claim 12 in which the gating means includes a positive injection plunger and operating means driven in synchronism with the advancing means to operate the plunger to introduce an interponent into the passage only when the advancing means is in proper condition to receive said interponent.

15. A sequential switching device comprising, in combination, an elongated housing; a passage extending longitudinally through said housing; an interponent in said passage; a series of switch-operating means spaced in line longitudinally on the housing and extending into the passage; means for advancing the interponent through said passage to cause said interponent to engage the switch-operating means seriatim; a gate at one end of said passage; an exit at the other end of said passage; a resilient conduit extending between the gate and the exit; a plurality of interponents held within the conduit, the interponent adjacent the gate being urged against the gate by the resiliency of the conduit; retaining means in the conduit adjacent the exit to prevent reverse movement of the interponents from the conduit through the exit into the passage, the interponent in the passage being forced by the advancing means past the retaining means into the conduit; and gate-operating means for operating the gate to enable one interponent at a time to enter the passage.

16. A sequential switching device comprising, in combination, a housing; a passage through said housing; an interponent in said passage; means for advancing the interponent through said passage in one or the other of two different paths; control means normally restraining the interponent to move in said one path and operable to enable the interponent to shift to the other path at any desired time during the movement of the interponent through the passage; contact-operating means for operating contacts of the switching device cooperating with said interponent and operated thereby when said interponent is moved in said one path past the means to cause the contacts to be operated in sequential order, said interponent when moved in the other path being ineffective to operate said contact-operating means, the number of contacts operated in sequential order being dependent upon the time at which the control means operates to enable the interponent to be shifted from said one path to said other path during its movement through the passage; and interponent supply means including a plurality of interponents and a gating means at one end of the passage for introduction of interponents into the passage and an exit at the other end of the passage to return the interponent to the supply means, said gating means being operable as soon as an interponent in the passage is shifted from said one path to said other path, to introduce another interponent into the passage to immediately commence another seriatim operation of the contact-operating means, while the first interponent continues to be advanced in said other path to be returned to the interponent supply means.

17. A sequential switching device comprising, in combination, a housing; a passage through said housing; an interponent in said passage; means for advancing the interponent through said passage in one or the other of two different paths; control means normally restraining the interponent to move in one path and operable to enable the interponent to be shifted from one path to the other at any desired time during the movement through the passage; a plurality of groups of contacts; common connecting corresponding contacts in each group; and contact-operating means for each group to close the contacts in its group, each of said contact-operating means cooperating with said interponent when said interponent is moved in said one path past the means to cause the contacts of the corresponding group to be operated, the interponent coacting with the various contact-operating means to operate the contact groups in sequential order, the number of groups operated in sequential order being dependent upon the time at which the interponent is shifted from said one path to said other path during its movement through the passage.

18. The sequential switching device of claim 17 in which each contact group includes first and second sets of spaced-apart contact blades and a third set of contact blades operated by the contact-operating means to connect corresponding contact blades in the first and second sets.

19. The sequential switching device of claim 17 in which each contact group includes first and second sets of normally-separated contact blades, the blades of one of said sets being operated by the contact-operating means to move in unison into contact with corresponding blades of the other set.

20. A sequential switching device comprising, in combination, a housing; a passage through said housing; an interponent in said passage; means for advancing the interponent through said passage in one or the other of two different paths; control means normally restraining the interponent to move in one of said paths and operable to enable the interponent to shift to the other path at any desired time during the movement of the interponent through the passage; contact-operating means for operating sets of contacts of the switching device cooperating with said interponent and operated thereby when said interponent is moved in said one path past the means to cause the sets of contacts to be operated in sequential order, the number of sets of contacts operated in sequential order being dependent upon the time at which the interponent is shifted from said one path to said other path during its movement through the passage; a solenoid for operating the control means; a circuit for operating said solenoid; and programming means for incorporating a preselected set of the contacts of the switching device in the solenoid operating circuit, whereby the operation of the preselected set of contacts of the switching device is effective to energize the solenoid to operate said control means to enable the interponent to shift to said other path to prevent further operation of the sets of switches when said preselected set of switches is operated at the end of the program.

References Cited in the file of this patent

UNITED STATES PATENTS

| | | |
|---|---|---|
| 1,563,906 | Kleinschmidt | Dec. 1, 1925 |
| 1,771,905 | Uher | July 29, 1930 |
| 2,406,028 | Myers | Aug. 20, 1946 |
| 2,734,604 | Soave | Feb. 14, 1956 |
| 2,817,703 | Naxon | Dec. 24, 1957 |